US00RE44864E

(19) United States
(12) Reissued Patent
Wenisch et al.

(10) Patent Number: US RE44,864 E
(45) Date of Reissued Patent: *Apr. 29, 2014

(54) SWITCHING ELEMENT FOR A VALVE TRAIN OF AN INTERNAL COMBUSTION ENGINE

(75) Inventors: Hermann Wenisch, Herzogenaurach (DE); Mario Kuhl, Dobra (DE); Peter Sailer, Erlangen (DE); Oliver Schnell, Veitsbronn (DE)

(73) Assignee: Ina Schaeffler KG, Herzogenaurach (DE)

( * ) Notice: This patent is subject to a terminal disclaimer.

(21) Appl. No.: 11/206,280

(22) Filed: Aug. 18, 2005

Related U.S. Patent Documents

Reissue of:
(64) Patent No.: 6,606,972
Issued: Aug. 19, 2003
Appl. No.: 10/246,278
Filed: Sep. 18, 2002

(30) Foreign Application Priority Data

Sep. 19, 2001 (DE) ..... 101 46 129

(51) Int. Cl.
*F01L 1/34* (2006.01)

(52) U.S. Cl.
USPC ..... 123/90.17; 123/90.16; 123/90.48; 123/90.55

(58) Field of Classification Search
USPC ..... 123/90.16, 90.2, 90.27, 90.31, 90.48, 123/90.55, 90.45, 90.46, 90.52, 90.17
See application file for complete search history.

(56) References Cited

U.S. PATENT DOCUMENTS 3,108,580 A 10/1963 Crane
3,886,808 A 6/1975 Weber ..... 74/569

(Continued)

FOREIGN PATENT DOCUMENTS

DE 42 06 166 A1 9/1992
DE 43 32 660 A1 3/1995

(Continued)

OTHER PUBLICATIONS

Buuk, B. et al., "Engine Trends and Valve Train Systems for Improved Performance and Fuel Economy", Eaton Corporation—Engine Components Operations, USA, pp. 1-9 (Aug. 1999).
Fortnagel, M. et al., "Four Made of Eight—The New 4.31 and 5.01 V8 Engines", Mercedes-Benz S-Class, pp. 58-62 (1997).
Sandford, M. et al., "Reduced Fuel Consumption and Emissions Through Cylinder Deactivation", Aachener Kolloquium Fahrzeug- und Motorentechnik, pp. 1017-1027 (1998).

(Continued)

*Primary Examiner* — Ching Chang
(74) *Attorney, Agent, or Firm* — Fitzpatrick, Cella, Harper & Scinto

(57) ABSTRACT

In a switching element (1) for a valve train of an internal combustion engine for switching to different valve lifts, said switching element (1) comprising an outer element (2) having an inner element (4) arranged for axial displacement therein, each of the outer and the inner element (2, 4) comprising a reception (11, 9) aligned to each other in a relative position, at least one piston (10) being arranged in at least one of the receptions (11, 9) for sliding toward the other of the receptions (9, 11) to couple the inner element (4) to the outer element (2) in said relative position, and a high-position stop for defining said relative position being arranged between the inner and the outer element (4, 2), at least one part of the high-position stop is configured as an adjustable, separate element (13). This element (13) cooperates through a preferably conical section (15) of its outer periphery with a complementary chamfer (18) on one end (17) of a guide (16) in the outer element (2). By these extremely simple fabrication measures, an aligned adjustment of the receptions (9, 11) is created for effecting coupling.

23 Claims, 1 Drawing Sheet

(56) References Cited

U.S. PATENT DOCUMENTS

| | | | | |
|---|---|---|---|---|
| 4,054,109 | A | 10/1977 | Herrin et al. | 123/90.16 |
| 4,083,334 | A | 4/1978 | Roncon | 123/90.35 |
| 4,089,234 | A | 5/1978 | Henson et al. | 74/569 |
| 4,098,240 | A | 7/1978 | Abell | 123/90.55 |
| 4,133,332 | A | 1/1979 | Benson et al. | 123/198 F |
| 4,164,917 | A | 8/1979 | Glasson | 123/321 |
| 4,207,775 | A | 6/1980 | Lintott | 74/55 |
| 4,228,771 | A | 10/1980 | Krieg | 123/90.55 |
| 4,231,267 | A | 11/1980 | Van Slooten | 74/569 |
| 4,386,806 | A | 6/1983 | Axen et al. | 299/5 |
| 4,463,714 | A | 8/1984 | Nakamura | 123/90.57 |
| 4,546,734 | A | 10/1985 | Kodama | 123/90.16 |
| 4,576,128 | A | 3/1986 | Kenichi | 123/198 |
| 4,615,307 | A | 10/1986 | Kodama et al. | 123/90.16 |
| 4,739,675 | A | 4/1988 | Connell | 74/569 |
| 4,768,475 | A | 9/1988 | Ikemura | 123/90.16 |
| 4,790,274 | A | 12/1988 | Inoue et al. | 123/198 F |
| 4,905,639 | A | 3/1990 | Konno | 123/90.16 |
| 4,913,106 | A | 4/1990 | Rhoads | 123/90.49 |
| 4,941,438 | A | 7/1990 | Muto | 123/90.46 |
| 4,942,855 | A | 7/1990 | Muto | 123/90.33 |
| 5,085,182 | A | 2/1992 | Nakamura et al. | 123/90.16 |
| 5,088,455 | A | 2/1992 | Moretz | 123/90.5 |
| 5,090,364 | A | 2/1992 | McCarroll et al. | 123/90.16 |
| 5,099,806 | A | 3/1992 | Murata et al. | 123/90.16 |
| 5,245,958 | A | 9/1993 | Krieg et al. | 123/90.55 |
| 5,247,913 | A | 9/1993 | Manolis | 123/90.16 |
| 5,253,621 | A | 10/1993 | Dopson et al. | 123/90.16 |
| 5,255,639 | A | 10/1993 | Shirey et al. | 123/90.16 |
| 5,261,361 | A | 11/1993 | Speil | 123/90.22 |
| 5,307,769 | A | 5/1994 | Meagher et al. | 123/90.5 |
| 5,345,904 | A | 9/1994 | Dopson et al. | 123/198 F |
| 5,351,662 | A | 10/1994 | Dopson et al. | 123/90.16 |
| 5,357,916 | A | 10/1994 | Matterazzo | 123/90.16 |
| 5,361,733 | A | 11/1994 | Spath et al. | 123/90.16 |
| 5,398,648 | A | 3/1995 | Spath et al. | 123/90.16 |
| 5,402,756 | A | 4/1995 | Bohme et al. | 123/90.16 |
| 5,419,290 | A | 5/1995 | Hurr et al. | 123/90.16 |
| 5,429,079 | A | 7/1995 | Murata et al. | 123/90.16 |
| 5,431,133 | A | 7/1995 | Spath et al. | 123/90.16 |
| 5,501,186 | A | 3/1996 | Hara et al. | 123/90.16 |
| 5,544,626 | A | 8/1996 | Diggs et al. | 123/90.16 |
| 5,544,628 | A | 8/1996 | Voigt | 123/90.16 |
| 5,546,899 | A | 8/1996 | Sperling et al. | 123/90.5 |
| 5,555,861 | A | 9/1996 | Mayr et al. | 123/90.16 |
| 5,615,651 | A | 4/1997 | Miyachi | 123/198 F |
| 5,651,335 | A | 7/1997 | Elendt et al. | 123/90.16 |
| 5,655,487 | A | 8/1997 | Maas et al. | 123/90.16 |
| 5,660,153 | A | 8/1997 | Hampton et al. | 123/90.16 |
| 5,669,342 | A | 9/1997 | Speil | 123/90.16 |
| 5,682,848 | A | 11/1997 | Hampton et al. | 123/90.16 |
| 5,709,180 | A | 1/1998 | Spath | 123/90.16 |
| 5,720,244 | A | 2/1998 | Faria | 123/90.16 |
| 5,782,216 | A | 7/1998 | Haas et al. | 123/90.16 |
| 5,803,040 | A | 9/1998 | Biesinger et al. | 123/198 F |
| 5,832,884 | A | 11/1998 | Haas et al. | 123/90.16 |
| 5,875,748 | A | 3/1999 | Haas et al. | 123/90.16 |
| 5,893,344 | A | 4/1999 | Church | 123/90.16 |
| 5,934,232 | A | 8/1999 | Greene et al. | 123/90.16 |
| 6,032,643 | A | 3/2000 | Hosaka et al. | 123/321 |
| 6,039,017 | A | 3/2000 | Hendriksma | 123/90.43 |
| 6,053,133 | A | 4/2000 | Faria et al. | 123/90.16 |
| 6,076,491 | A | 6/2000 | Allen | 123/90.16 |
| 6,092,497 | A | 7/2000 | Preston et al. | 123/90.16 |
| 6,095,696 | A | 8/2000 | Foldi | 385/79 |
| 6,164,255 | A | 12/2000 | Maas et al. | 123/90.16 |
| 6,196,175 | B1 * | 3/2001 | Church | 123/90.16 |
| 6,196,176 | B1 | 3/2001 | Groh et al. | 123/90.16 |
| 6,213,076 | B1 | 4/2001 | Fischer et al. | 123/90.55 |
| 6,244,229 | B1 | 6/2001 | Nakano et al. | 123/90.15 |
| 6,247,433 | B1 | 6/2001 | Faria et al. | 123/90.16 |
| 6,257,185 | B1 | 7/2001 | Groh et al. | 123/90.16 |
| 6,273,039 | B1 | 8/2001 | Church | 123/90.16 |
| 6,318,324 | B1 | 11/2001 | Koeroghlian et al. | 123/90.55 |
| 6,321,704 | B1 * | 11/2001 | Church et al. | 123/90.16 |
| 6,321,705 | B1 | 11/2001 | Fernandez et al. | 123/90.16 |
| 6,325,030 | B1 | 12/2001 | Spath et al. | 123/90.16 |
| 6,345,596 | B1 | 2/2002 | Kuhl | 123/90.16 |
| 6,405,699 | B1 | 6/2002 | Church | 123/90.5 |
| 6,412,460 | B1 | 7/2002 | Sato et al. | 123/90.16 |
| 6,427,652 | B2 * | 8/2002 | Faria et al. | 123/90.16 |
| 6,439,176 | B1 | 8/2002 | Payne | 123/90.12 |
| 6,460,499 | B1 | 10/2002 | Mason et al. | 123/90.55 |
| 6,477,997 | B1 | 11/2002 | Wakeman | 123/90.16 |
| 6,497,207 | B2 * | 12/2002 | Spath et al. | 123/90.16 |
| 6,513,470 | B1 | 2/2003 | Hedriksma et al. | 123/90.16 |
| 6,578,535 | B2 | 6/2003 | Spath et al. | 123/90.16 |
| 6,588,394 | B2 | 7/2003 | Zheng et al. | 123/198 F |
| 6,591,796 | B1 | 7/2003 | Scott | 123/90.13 |
| 6,595,174 | B2 | 7/2003 | Schnell | 123/90.55 |
| 6,606,972 | B2 | 8/2003 | Wenisch et al. | 123/90.17 |
| 6,615,783 | B2 | 9/2003 | Haas et al. | 123/90.48 |
| 6,655,487 | B2 | 12/2003 | Mallette et al. | 180/190 |
| 6,668,776 | B2 | 12/2003 | Hendriksma et al. | 123/90.16 |
| 6,745,737 | B2 | 6/2004 | Evans et al. | 123/90.5 |
| 6,748,914 | B2 | 6/2004 | Spath et al. | 123/90.48 |
| 6,802,288 | B2 | 10/2004 | Spath | 123/90.16 |
| 6,814,040 | B2 | 11/2004 | Hendriksma et al. | 123/90.59 |
| 6,866,014 | B2 | 3/2005 | Spath | 123/90.5 |
| 6,920,857 | B2 | 7/2005 | Spath | 123/90.48 |
| 6,976,463 | B2 | 12/2005 | Spath et al. | 123/90.59 |
| 6,977,154 | B1 * | 12/2005 | Choo et al. | 435/7.1 |
| 6,997,154 | B2 | 2/2006 | Geyer et al. | 123/90.44 |
| 7,007,651 | B2 | 3/2006 | Spath | 123/90.5 |
| 7,036,481 | B2 * | 5/2006 | Sailer et al. | 123/198 F |
| 7,055,479 | B2 * | 6/2006 | Sailer et al. | 123/90.59 |
| 7,146,951 | B2 * | 12/2006 | Sailer et al. | 123/90.45 |
| 7,207,303 | B2 | 4/2007 | Geyer et al. | 123/90.55 |
| 7,210,439 | B2 | 5/2007 | Geyer et al. | 123/90.55 |
| 2001/0009145 | A1 | 7/2001 | Faria et al. | 123/90.16 |
| 2002/0038642 | A1 | 4/2002 | Haas et al. | 123/90.48 |
| 2002/0195072 | A1 | 12/2002 | Spath et al. | 123/90.16 |
| 2003/0070636 | A1 | 4/2003 | Evans et al. | 123/90.5 |
| 2003/0075129 | A1 | 4/2003 | Spath et al. | 123/90.16 |
| 2003/0101953 | A1 | 6/2003 | Hendriksma et al. | 123/90.16 |
| 2005/0081811 | A1 | 4/2005 | Spath et al. | 123/90.48 |
| 2005/0103300 | A1 | 5/2005 | Spath et al. | 123/90.59 |
| 2005/0120989 | A1 | 6/2005 | Geyer et al. | 123/90.59 |
| 2006/0191503 | A1 | 8/2006 | Geyer et al. | 123/90.15 |

FOREIGN PATENT DOCUMENTS

| | | | |
|---|---|---|---|
| DE | 4333927 | A1 | 4/1995 |
| DE | 195 02 332 | A1 | 8/1996 |
| DE | 19502332 | | 8/1996 |
| DE | 198 04 952 | A1 | 8/1999 |
| DE | 198 44 202 | A1 | 3/2000 |
| DE | 19844202 | | 3/2000 |
| DE | 199 15 531 | A1 | 10/2000 |
| DE | 199 15 532 | A1 | 10/2000 |
| DE | 199 19 245 | A1 | 11/2000 |
| EP | 0 318 151 | A1 | 5/1989 |
| EP | 0 608 925 | B1 | 8/1994 |
| EP | 1 149 989 | A1 | 10/2001 |
| GB | 574 852 | A | 1/1946 |
| GB | 2 272 022 | | 5/1994 |
| WO | 9530081 | A1 | 11/1995 |

OTHER PUBLICATIONS

Chrysler Group, "Design Practice Standards", Paper dated Mar. 15, 2005, 1 page, in German with English Translation (2 pages).

Quan Zheng, "Characterization of the Dynamic Response of a Cylinder Deactivation Valvetrain System," Society of Automotive Engineers, Inc., SAE Technical Paper Series, Mar. 2001, pp. 195-201.

K. Hampton, Eaton VRRS System, Society of Automotive Engineers, Inc., Variable Value Actuation TOPTEC®: The State of the Art, Sep. 11-12, 2000, 25 pages.

O. Schnell, "DaimlerChrysler 5.7L MDS Lifter," (on or about) Jan. 29, 2001, pp. 1-6.

* cited by examiner

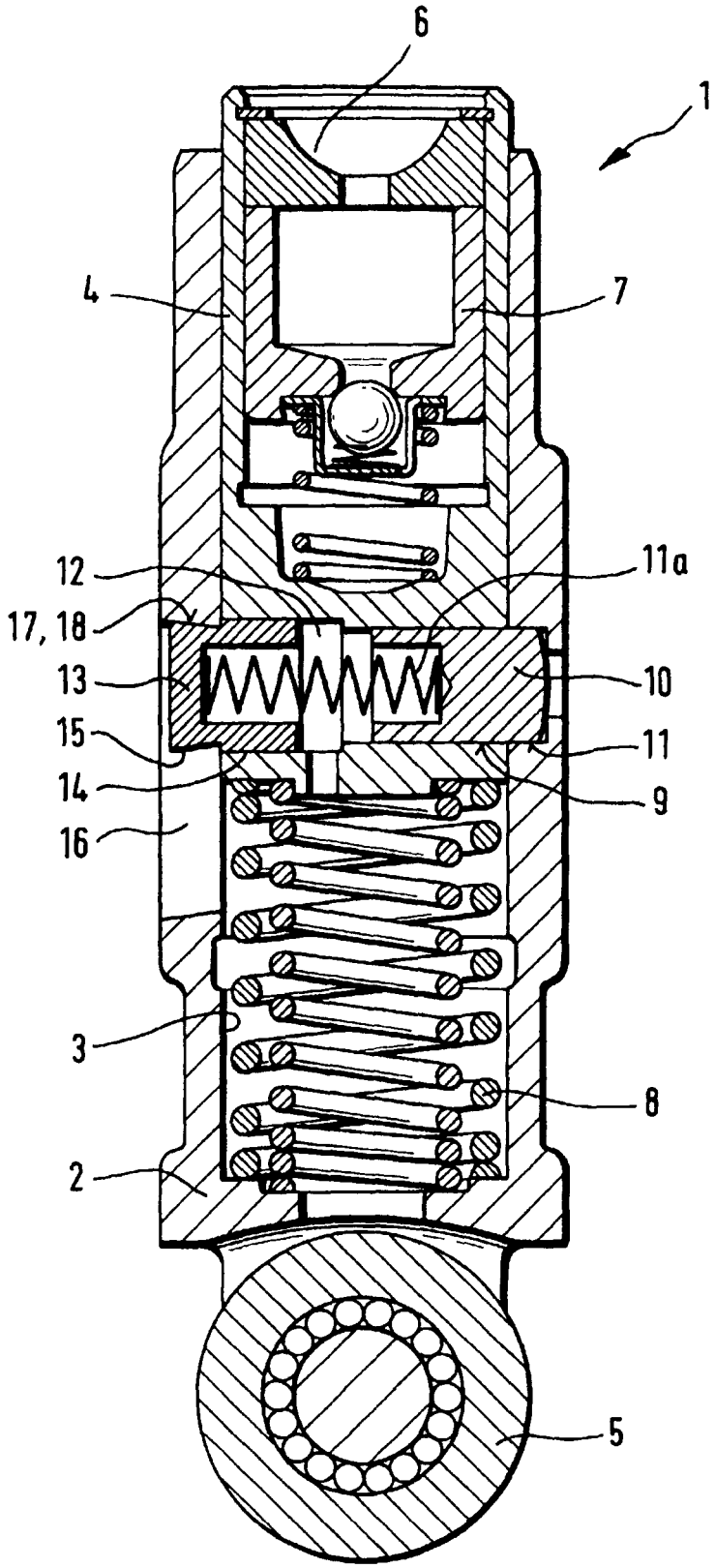
6
1
4
7
12
11a
17, 18
13
10
15
11
14
9
16
3
8
2
5

SWITCHING ELEMENT FOR A VALVE TRAIN OF AN INTERNAL COMBUSTION ENGINE

Matter enclosed in heavy brackets [ ] appears in the original patent but forms no part of this reissue specification; matter printed in italics indicates the additions made by reissue.

*This application is a reissue of U.S. Pat. No. 6,606,972 B2, issued on Aug. 19, 2003, from U.S. application Ser. No. 10/246,278, filed Sep. 18, 2002.*

FIELD OF THE INVENTION

The invention concerns a switching element for a valve train of an internal combustion engine for switching to different valve lifts, said switching element comprising an outer element having an inner element arranged for axial displacement therein, each of the outer and the inner element comprising a reception aligned to each other in a relative position, at least one piston being arranged in at least one of the receptions for sliding toward the other of the receptions to couple the inner element to the outer element in said relative position, and a high-position stop for defining said relative position being arranged between the inner and the outer element.

BACKGROUND OF THE INVENTION

A switching element of the pre-cited type is disclosed in the generic prior art document DE 199 15 531 which shows a switchable cam follower for a tappet push rod drive. The high-position stop for defining the relative position is formed by a piston-like element arranged in the inner element. This piston-like element projects radially outward into a longitudinal groove of the outer element. In the axially extracted state of the inner element from the outer element, the piston-like element abuts against one end of the longitudinal groove. The purpose of this is to create an aligned arrangement of a coupling bore made in the outer element for a piston arranged in the inner element for achieving coupling.

A drawback of this prior art is that an adjustment of lash in the coupling is relatively complicated and cost-intensive. It is clear that the reception (coupling bore) in the outer element for receiving the piston must be configured with a slight lash relative to the outer peripheral surface of the piston. This lash and the high position differ from switching element to switching element due to fabrication conditions. The relatively wide range of variance of this mechanical idle travel in switching elements is, however, undesirable.

In other words, a lash, i.e. an idle travel that the inner element undergoes relative to the outer element upon coupling and loading by the cam till the outer element participates in the force flow from the cam can be compensated by an appropriate dimensioning of the cam contour. In practice, however, this results in a relatively large dispersion of lash. This leads to an undesired variance of the overlap of the intake and exhaust valves. Besides this, an undesired large amount of wear occurs if the lash between the coupling piston and its surrounding reception is too large.

To keep the coupling lash or its variance within acceptable limits, the prior art has recourse to a grouping of the coupling pistons. This procedure is extremely expensive from the point of view of fabrication and measuring techniques. For example, the switching elements are first completely mounted, the lash is then measured following which, the switching elements are dismounted again and an appropriate piston is then chosen for coupling. It is equally conceivable to group the high-position stops provided on the longitudinal grooves of the outer elements.

OBJECTS OF THE INVENTION

It is an object of the invention to provide a switching element of the pre-cited type in which the aforesaid drawbacks are eliminated by simple measures.

This and other objects and advantages of the invention will become obvious from the following detailed description.

SUMMARY OF THE INVENTION

The invention achieves the above objects by the fact that at least one part of the high-position stop is configured as an adjustable, separate element which in a particularly preferred embodiment of the invention, is a piston-like element, a first section of whose outer periphery is fixed in a recess of one of the inner element and the outer element, and a second section of whose outer periphery engages a guide such as a slot that is made in the other of the inner element and the outer element and has a length that is at least equal to a relative motion between the inner element and the outer element. One end of the guide forms a further part of the high-position stop, and at least that end of the piston-like element that is situated opposite said one end of the guide comprises a chamfer that bears against a complementary chamfer of the said one end of the guide in the relative position, said piston-like element being axially displaceable in the relative position for establishing an alignment of the receptions of the inner and the outer element.

Due to the fact that the piston-like element is axially displaceable in its recess and, in the ideal case but not necessarily, has a conical surface forming the high-position stop, the aforesaid drawbacks are eliminated by simple measures During the assembly of the piston-like element to form the high-position stop (pressing or screwing-in or any other method familiar to the person skilled in the art) the mechanical idle travel of the coupling element (piston) relative to its surrounding reception can be adjusted by choosing different assembling depths. This means in other words, that in the axially extracted state of the inner element from the outer element, the high-position stop of the invention enables the axis of the reception for effecting coupling to be adjusted or brought into alignment to the axis of the reception for the piston.

The scope of this invention extends explicitly not only to switching elements such as cam followers in tappet push rod drives or cup tappets and support elements for finger levers but also to switching elements installed directly in lever-type cam followers. The scope of this extension extends equally to other mechanical locking devices that are installed, for instance, in camshaft adjusters and the like for adjusting their start position.

In a particularly simple variant of an embodiment of a peripheral section of the piston-like element that cooperates with the guide, this section has a generally conical configuration as described above. This section or the entire outer peripheral surface can also be precision worked by centerless grinding or the like The receptions for the piston and the recess for the piston-like element extend preferably radially through the switching element that preferably has a cylindrical shape. If the piston is arranged in the inner element, it is particularly advantageous from the fabrication point of view if the recess of the inner element for fixing the piston-like element is aligned to the reception for the piston in the inner element. Advantageously, in this case, a through-bore can be made.

According to further features of the invention when used in a series of switching elements for internal combustion engines of the same type, a lash of the pistons relative to the surrounding receptions, when coupled, is the same in all the switching elements in their unloaded state, and a distance of the pistons from stops of the surrounding receptions, which stops are situated axially opposite the ends of the guides in the coupled state, is also the same in all the switching elements in their unloaded state. This applies, of course, only in the ideal case but the invention enables the variance of the lash of the elements to be kept within such narrow limits that there is no, or no noteworthy influence on the valve overlap mentioned above. The order of magnitude of this lash is 0.1 mm or approximately this value, with a tolerance of +/−0.010 mm. Thus, generally speaking, the lash or the idle travel is adjusted *to a predetermined value* in the range of one tenth of a millimeter and the tolerance is in the range of one hundredth of a millimeter.

The invention will now be described more closely with reference to the appended drawing.

BRIEF DESCRIPTION OF THE DRAWING

The sole FIGURE shows, in a longitudinal section, a switching element of the invention made in the present case as a roller tappet for a tappet push rod drive.

DETAILED DESCRIPTION OF THE DRAWING

The FIGURE discloses a switching element 1 that is configured as a roller tappet. The switching element is designed for switching to different valve lifts, in the present case, for switching between a zero lift and a full lift. The switching element 1 comprises an outer element 2 in whose recess 3 an inner element 4 is received for axial displacement.

On one end, the switching element 1 comprises a roller 5 for contacting a cam and acts at the opposite end through a support 6 on a tappet push rod in lifting direction. In the present example, the support 6 is a part of a hydraulic lash adjuster 7.

A lost motion spring 8 that does not need to be described here, acts axially between the inner element 4 and the outer element 2. The inner element 4 comprises a radially extending cylindrical reception 9 in which a piston 10 for coupling the inner element 4 to the outer element 2 is received. The piston 10 is biased radially outward by the force of a compression spring 11a. In the relative position of the inner element 4 to the outer element 2 shown in the FIGURE, a reception 11 in the outer element 2 is situated opposite the piston 10. For coupling, the piston 10 can be displaced partially into the reception 11 by the force of the compression spring 11a.

The inner element 4 comprises a recess 12 that is arranged diametrically opposite and axially aligned to the reception 9. A piston-like element 13 forming a high-position stop (and also an anti-rotation device between the inner element 4 and the outer element 2) extends with an inner peripheral section 14 in the recess 12.

A radially outer peripheral section 15 of the element 13 extends into a guide 16 made as a longitudinal groove in the outer element 2. The length of the guide 16 is at least equal in dimension to a relative travel of the inner element 4 to the outer element 2 in the deactivated or uncoupled state of the switching element 1. An upper end 17 of the guide 16 defines a stop for the adjustable, separate element 13 of the invention. The outer peripheral section 15 of the element 13 has a conical configuration. The end 17 comprises a chamfer 18 of complementary shape to this conical configuration.

As described in detail above, it is possible with the adjustable, separate piston-like element 13, to realize in a very simple manner from the fabrication point of view, an alignment of the reception 9 for the piston 10 to the reception 11 in the outer element 2. For achieving this, when the element 13 is being pressed into the recess 12, it is pressed axially toward the reception 9 for the piston 10 till the piston 10, of course in the unloaded state of the switching element 1, is surrounded by the reception 11 uniformly and with slight lash upon coupling. In this way, an idle travel that the inner element 4 undergoes with the piston 10 in the reception 11 relative to the outer element 2 upon coupling to the outer element 2 and at the onset of loading by the cam is uniformly small throughout a series of switching elements 1 in internal combustion engines of the same type.

What is claimed is:

1. A switching element for a valve train of an internal combustion engine for switching to different valve lifts, said switching element comprising an outer element having an inner element arranged for axial displacement therein, each of the outer *element* and the inner element comprising a reception aligned to each other in a relative position, at least one piston being arranged in at least one of the receptions for sliding toward the other of the receptions to couple the inner element to the outer element in said relative position, and a high-position stop for defining said relative position being arranged between the inner *element* and the outer element, wherein at least one part of the high-position stop is configured as an adjustable, separate *piston* element[, the adjustable, separate element is a piston-like element, a first section of whose outer periphery is fixed in a recess of one of the inner element and the outer element, and a second section of whose outer periphery engages a guide that is made as a slot in the other of the inner element and the outer element and has a length that is at least equal to a relative motion between the inner element and the outer element, one end of the guide forms a further part of the high-position stop, and at least that end of the piston-like element that is situated opposite said one end of the guide comprises a chamfer that bears against a complementary chamfer of the said one end of the guide in the relative position, said piston-like element being axially displaceable in the relative position for establishing an alignment of the receptions of the inner and the outer element] *having a configuration for entry into a recess of one of the inner element and the outer element, opposite the receptions, to position the at least one piston so that mechanical lash of a predetermined value is provided between the at least one piston and at least one of the receptions.*

2. A switching element of claim 1, wherein [the second] *a* section [of the outer periphery] of the [piston-like] *separate piston* element has a conical configuration.

3. A switching element of claim 1, wherein the [piston-like] *separate piston* element enables an alignment of the receptions of the [inner] *outer element* and the [outer] *inner* element so that upon coupling, in the unloaded state of the switching element, the *at least one* piston is uniformly surrounded with slight lash by the reception in which it is arranged.

4. A switching element of claim 1, wherein at least one of [the] first and [the] second sections [of the outer periphery] of the [piston-like] *separate piston* element is ground by centerless grinding.

5. A switching element of claim 1, wherein the *at least one* piston and the [piston-like] *separate piston* element are arranged in the inner element, and the recess of the inner element for fixing the [piston-like] *separate piston* element is aligned to the reception for the *at least one* piston in the inner element.

6. A switching element of claim 1, wherein the piston and the [piston-like] *separate piston* element are arranged in the inner element, and the recess of the inner element for fixing the [piston-like] *separate piston* element is made as a common bore with the reception for the piston in the inner element.

7. A series of switching elements of claim 1 for internal combustion engines of a same type wherein the alignment of the receptions of the [inner] *outer element* and the [outer] *inner* element is realized by the high-position stops of the switching elements so that a lash of the pistons, when coupled, relative to the receptions in which they are arranged is the same in all the switching elements of the series in an unloaded state of the switching elements.

8. A series of switching elements of claim 1 for internal combustion engines of a same type wherein a distance of the pistons, when coupled, from stops of the receptions in which they are arranged is the same in all the switching elements of the series in an unloaded state of the switching elements[, said stops being situated axially opposite said one ends of the guides in the coupled state].

9. A switching element of claim 1 configured as one of a cam follower in a tappet push rod drive, a cup tappet and a support element for a finger lever.

*10. A switching element for a valve train of an internal combustion engine for switching to different valve lifts, said switching element comprising an outer element having an inner element arranged for axial displacement therein, each of the outer element and the inner element comprising a reception aligned to each other in a relative position, at least one piston being arranged in at least one of the receptions for sliding toward the other of the receptions to couple the inner element to the outer element in said relative position, and a high-position stop for defining said relative position being arranged between the inner element and the outer element, wherein at least one part of the high-position stop is a separate piston element adjustable for entry into a recess of one of the inner element and the outer element, opposite the receptions, wherein the separate piston element comprises a first section having its outer periphery fixed in the recess of one of the inner element and the outer element, and a second section having its outer periphery engaging a guide that is made as a slot in the other of the inner element and the outer element, the guide having a length that is at least equal to a relative motion between the inner element and the outer element.*

*11. A switching element of claim 10, wherein one end of the guide forms a further part of the high-position stop, and at least that end of the separate piston element that is situated opposite said one end of the guide comprises a chamfer that bears against a complementary chamfer of the said one end of the guide in the relative position, the separate piston element being axially displaceable in the relative position for establishing an alignment of the receptions of the outer element and the inner element.*

*12. A switching element for a valve train of an internal combustion engine for switching to different valve lifts, said switching element comprising an outer element having an inner element arranged for axial displacement therein, each of the outer element and the inner element comprising a reception aligned to each other in a relative position, at least one piston being arranged in at least one of the receptions for sliding toward the other of the receptions to couple the inner element to the outer element in said relative position, and a high-position stop for defining said relative position being arranged between the outer element and the inner element, wherein at least one part of the high-position stop is configured as an adjustable, separate element, the adjustable, separate element is a piston element, having a first section disposed in a recess of the inner element and a second section engaging a guide in the outer element, said piston element being axially displaceable in the relative position and having a configuration selected for establishing an alignment of the receptions of the outer element and the inner element and for positioning the at least one piston so that mechanical lash of a predetermined value is provided between the at least one piston and at least one of the receptions.*

*13. A switching element of claim 12, wherein one end of the guide forms a further part of the high-position stop.*

*14. A switching element of claim 12, wherein at least that end of the piston element that is situated opposite said one end of the guide comprises a chamfer that bears against a complementary chamfer of the said one end of the guide in the relative position.*

*15. A switching element for a valve train of an internal combustion engine for switching to different valve lifts, said switching element comprising an outer element having an inner element arranged for axial displacement therein, each of the outer element and the inner element comprising a reception aligned to each other in a relative position, at least one piston being arranged in at least one of the receptions for sliding toward the other of the receptions to couple the inner element to the outer element in said relative position, and a high-position stop for defining said relative position being arranged between the outer element and the inner element, wherein at least one part of the high-position stop is configured as an adjustable, separate element, the adjustable, separate element is a piston element, having a first section disposed in a recess of the inner element and a second section engaging a guide in the outer element, said piston element being axially displaceable in the relative position for establishing an alignment of the receptions of the outer element and the inner element, wherein the guide has a length that is at least equal to a relative motion between the outer element and the inner element.*

*16. A deactivatable lifter for a valve train of an internal combustion engine, said deactivatable lifter comprising:*

*an outer element and an inner element positioned therein and arranged for axial displacement within said outer element to effect selective activation of an associated valve in the train;*

*a lost motion spring positioned axially between the outer element and the inner element, and acting on said inner element;*

*each of the outer element and the inner element having an opening aligned with each other in a relative position;*

*at least one coupling element being arranged in at least one of the openings for sliding movement toward or away from the other of the openings to couple to or decouple from the outer element to effect activation or deactivation, respectively, of said associated valve; and*

*a stop member including a separate adjustable element defining an upper limit of relative motion between said outer element and said inner element of said lifter, the separate adjustable element having a configuration to position the at least one coupling element so that mechanical lash of a predetermined value is provided between the at least one coupling element and at least one of the openings.*

*17. A deactivatable lifter of claim 16, wherein the predetermined value is on the order of 0.1 mm.*

*18. A deactivatable lifter of claim 16, wherein at least one of the outer element and the inner element is generally cylindrical in shape.*

*19. A deactivatable lifter of claim 16, wherein the lost motion spring is positioned in the outer element, underneath a lower surface of the inner element.*

*20. A deactivatable lifter of claim 16, wherein the separate adjustable element is adjustable to provide a selected assembly depth.*

*21. A deactivatable lifter of claim 16, wherein the separate adjustable element enables alignment between the openings of the inner element and the outer element to be adjusted.*

*22. A deactivatable lifter of claim 16, wherein the lost motion spring is positioned between a lower surface of the inner element and a part of the outer element below the lower surface of the inner element.*

*23. A deactivatable lifter of claim 22, wherein the part of the outer element is an inner surface of the outer element.*

* * * * *